US009413867B2

(12) United States Patent
Hill et al.

(10) Patent No.: US 9,413,867 B2
(45) Date of Patent: Aug. 9, 2016

(54) COMMUNICATIONS SYSTEM PROVIDING CALLER IDENTIFICATION FEATURES BASED UPON NEAR FIELD COMMUNICATION AND RELATED METHODS

(75) Inventors: Thomas C. Hill, Crystal Lake, IL (US); Prateek Bhatnagar, Whitby (CA)

(73) Assignee: BlackBerry Limited, Waterloo, Ontario (CA)

( * ) Notice: Subject to any disclaimer, the term of this patent is extended or adjusted under 35 U.S.C. 154(b) by 22 days.

(21) Appl. No.: 13/344,900

(22) Filed: Jan. 6, 2012

(65) Prior Publication Data

US 2013/0178198 A1    Jul. 11, 2013

(51) Int. Cl.
*H04L 29/06* (2006.01)
*H04W 76/02* (2009.01)
*H04M 1/57* (2006.01)
*H04M 1/725* (2006.01)
*H04M 3/42* (2006.01)

(52) U.S. Cl.
CPC .......... *H04M 1/575* (2013.01); *H04M 1/7253* (2013.01); *H04M 3/42042* (2013.01); *H04M 3/42059* (2013.01); *H04M 3/42246* (2013.01); *H04M 2203/1091* (2013.01); *H04M 2250/04* (2013.01)

(58) Field of Classification Search
CPC .......... H04L 65/1069; H04L 65/1073; H04W 76/021; H04M 1/57
USPC ................. 455/415, 435.1, 555, 557; 713/173
See application file for complete search history.

(56) References Cited

U.S. PATENT DOCUMENTS

| 6,928,299 | B1 * | 8/2005 | Rinne et al. ................... 455/555 |
| 7,801,486 | B2 | 9/2010 | Barnier ........................ 455/41.2 |
| 7,865,555 | B2 | 1/2011 | Willey .......................... 709/206 |

(Continued)

FOREIGN PATENT DOCUMENTS

| GB | 2452020 | 2/2009 | ............ H04W 76/02 |
| WO | 2005006727 | 1/2005 | |

(Continued)

OTHER PUBLICATIONS

NFC vs. Bluetooth from http://www.nearfieldcommunication.org/bluetooth.html, Printed on Apr. 1, 2013.*

(Continued)

*Primary Examiner* — Joshua Schwartz
(74) *Attorney, Agent, or Firm* — Donna Flores; Fleit Gibbons Gutman Bongini & Bianco P.L.

(57) ABSTRACT

A communications system may include a telephone terminal, a first near field communication (NFC) device associated with the telephone terminal, a mobile wireless communications device, and a second NFC device associated with the mobile wireless communications device. The telephone terminal may have a first caller identification (ID) associated therewith, and the mobile communications device may have a second caller ID associated therewith different than the first caller ID. The telephone terminal may be configured to place a telephone call over a telephone network, and cooperate with the telephone network to substitute the second caller ID for the first caller ID when placing the telephone call based upon NFC communication between the first NFC device and the second NFC device.

12 Claims, 7 Drawing Sheets

(56) References Cited

U.S. PATENT DOCUMENTS

| | | | |
|---|---|---|---|
| 7,937,069 B2* | 5/2011 | Rassam | 455/406 |
| 2004/0204087 A1* | 10/2004 | Carlsson | 455/558 |
| 2006/0262929 A1 | 11/2006 | Vatanen et al. | 380/255 |
| 2007/0153771 A1 | 7/2007 | Doradla et al. | |
| 2008/0167022 A1 | 7/2008 | Lee et al. | 455/415 |
| 2008/0207124 A1 | 8/2008 | Raisanen et al. | 455/41.2 |
| 2008/0304640 A1 | 12/2008 | Reilly | |
| 2009/0082043 A1 | 3/2009 | Lazaridis | 455/466 |
| 2009/0262914 A1 | 10/2009 | Khouri et al. | 379/202.01 |
| 2009/0325491 A1 | 12/2009 | Bell et al. | 455/41.3 |
| 2010/0042546 A1* | 2/2010 | Humbel | 705/64 |
| 2010/0138754 A1 | 6/2010 | Wilson | 715/752 |
| 2010/0220845 A1 | 9/2010 | Oliver et al. | 379/202.01 |
| 2011/0045854 A1 | 2/2011 | Lazaridis | 455/566 |
| 2011/0078266 A1 | 3/2011 | Willey | 709/206 |
| 2011/0306330 A1* | 12/2011 | Sharp et al. | 455/417 |

FOREIGN PATENT DOCUMENTS

| | | | |
|---|---|---|---|
| WO | 2006/085269 | 8/2006 | H04M 1/725 |
| WO | 2008008093 | 1/2008 | |

OTHER PUBLICATIONS

History of NFC from http://www.nfc-forum.org/news/pr/view?item_key=d8968a33b4812e2509e5b74247d1366dc8ef91d8, Mar. 18, 2004.*

NFC Wikipedia Page from http://en.wikipedia.org/wiki/Near_field_communications, Printed on Apr. 1, 2013.*

"*Caller ID*" http://en.wikipedia.org/wiki/Caller_ID. Printed Jun. 2, 2011.

Anonymous, Near Field Communication White Paper, Internet Citation, Feb. 4, 2004, retrieved from the internet: http://www.ecma-international.org/activities/Communications/2004tg19-_001.pdf , [retrieved on Mar. 6, 2006].

* cited by examiner

COMMUNICATIONS SYSTEM PROVIDING CALLER IDENTIFICATION FEATURES BASED UPON NEAR FIELD COMMUNICATION AND RELATED METHODS

TECHNICAL FIELD

This application relates to the field of communications, and more particularly, to telephone communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
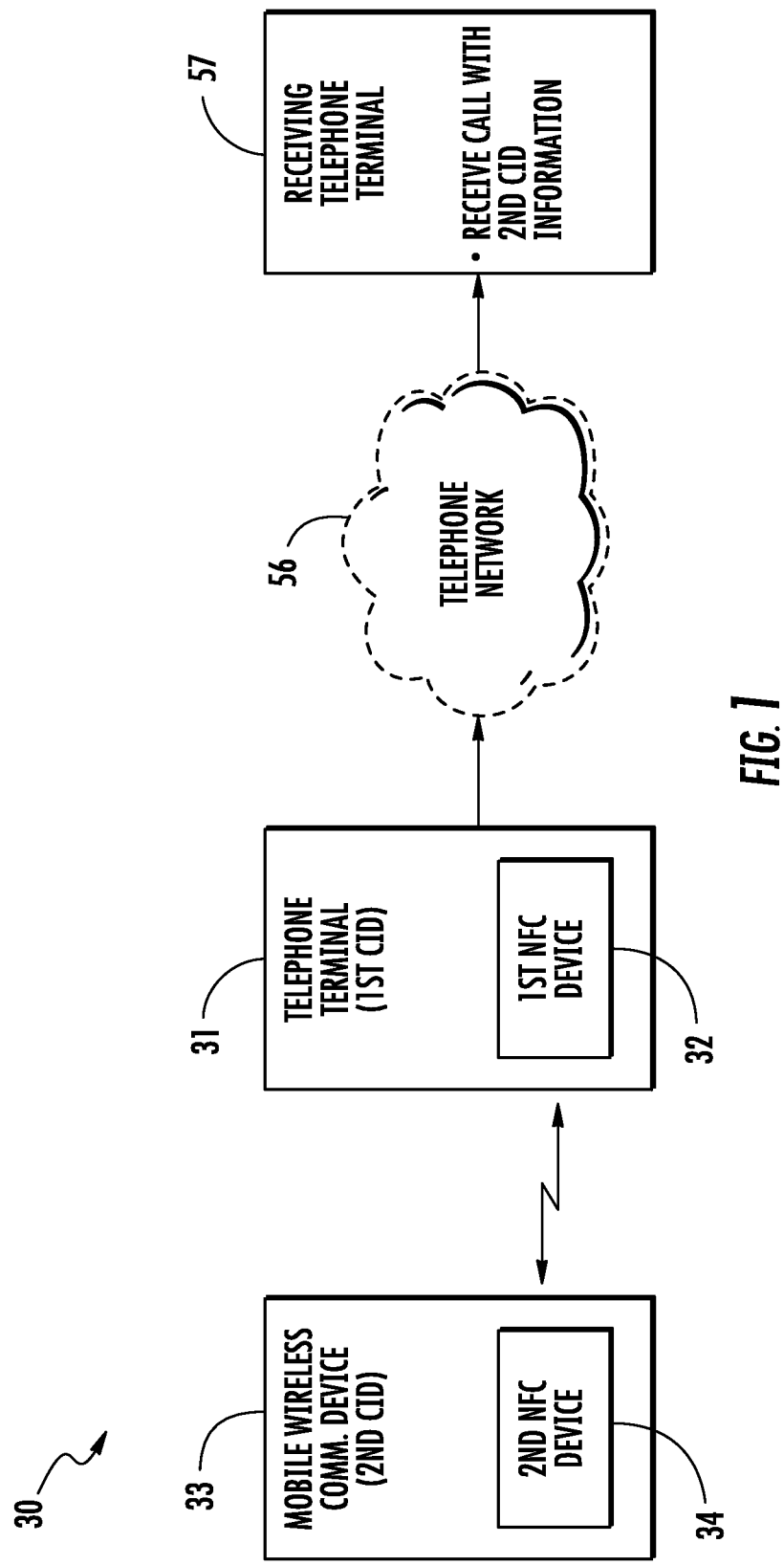
FIG. 1 is a schematic block diagram of a communications system in accordance with one example aspect.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system is provided herein which may include a telephone terminal, a first near field communication (NFC) device associated with the telephone terminal, a mobile wireless communications device, and a second NFC device associated with the mobile wireless communications device. The telephone terminal may have a first caller identification (ID) associated therewith, and the mobile communications device may have a second caller ID associated therewith different than the first caller ID. The telephone terminal may be configured to place a telephone call over a telephone network, and cooperate with the telephone network to substitute the second caller ID for the first caller ID when placing the telephone call based upon NFC communication between the first NFC device and the second NFC device. As such, it may appear to a call recipient that the call is originating from the mobile wireless communications device, while the call originator is able to use the telephone terminal for added convenience or to avoid undesirable wireless communications charges associated with the mobile wireless communications device.

By way of example, the second caller ID may comprise a telephone number associated with the mobile wireless communications device, a name associated with the mobile wireless communications device, etc. The mobile wireless communications device may further include an input device, and the mobile wireless communications device may be configured to provide the second caller ID to the telephone terminal via NFC communication based upon the input device. Moreover, the mobile wireless communications device may further comprise a display and a controller coupled with the display and the input device, and the controller may be further configured to generate a prompt on the display for authorizing communication of the second caller ID to the telephone terminal.

The telephone terminal may further comprise an input device, and the telephone terminal may be configured to provide the second caller ID to the telephone network based upon the input device. By way of example, the telephone terminal may comprise a public telephone terminal. Also, the telephone terminal may be configured to connect to the telephone network via a land line, for example. The mobile communications device may further include a wireless transceiver, such as a cellular transceiver, for example.

A related mobile wireless communications device and a related telephone terminal, such as those described briefly above, are also provided. A related communications method is for a telephone terminal having a first NFC device associated with the telephone terminal. The method may include placing telephone calls over a telephone network based upon the first caller identification (ID) associated with the telephone terminal. The method may further include communicating with a second NFC device associated with a mobile wireless communications device to receive a second caller ID associated with the mobile wireless communications device different than the first caller ID and, based upon receipt of the second caller ID, cooperating with the telephone network to substitute the second caller ID for the first caller ID when placing a telephone call.

Referring initially to FIG. 1, a communications system 30 illustratively includes a telephone terminal 31, a first near field communication (NFC) device 32 associated with the telephone terminal 31, a mobile wireless communications device 33 (also referred to as a "mobile device" herein), and a second NFC device 34 associated with the mobile device 33. By way of example, the telephone terminal 31 may be a land line telephone, such as a public telephone or a "desktop" phone in an office or conference room, although other suitable types of telephone terminals may also be used. Example mobile devices 33 may include portable or personal media players (e.g., music or MP3 players, video players, etc.), portable gaming devices, portable or mobile telephones, smartphones, tablet computers, digital cameras, etc.

The telephone terminal 31 has a first caller identification (ID or CID) associated therewith, and the mobile device 33 has a second caller ID associated therewith different than the first caller ID. For example, the first caller ID associated with the telephone terminal 31 may be a unique phone number assigned to that telephone terminal, or a name associated with the terminal (e.g., registered user or owner name, name of physical location, etc.), for example. Similarly, the second caller ID associated with the mobile device 33 may also be a unique phone number, name, etc.

The mobile device 33 may advantageously be used to communicate the second caller ID to the telephone terminal 31 via the first NFC device 32 and the second NFC device 34. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 2:
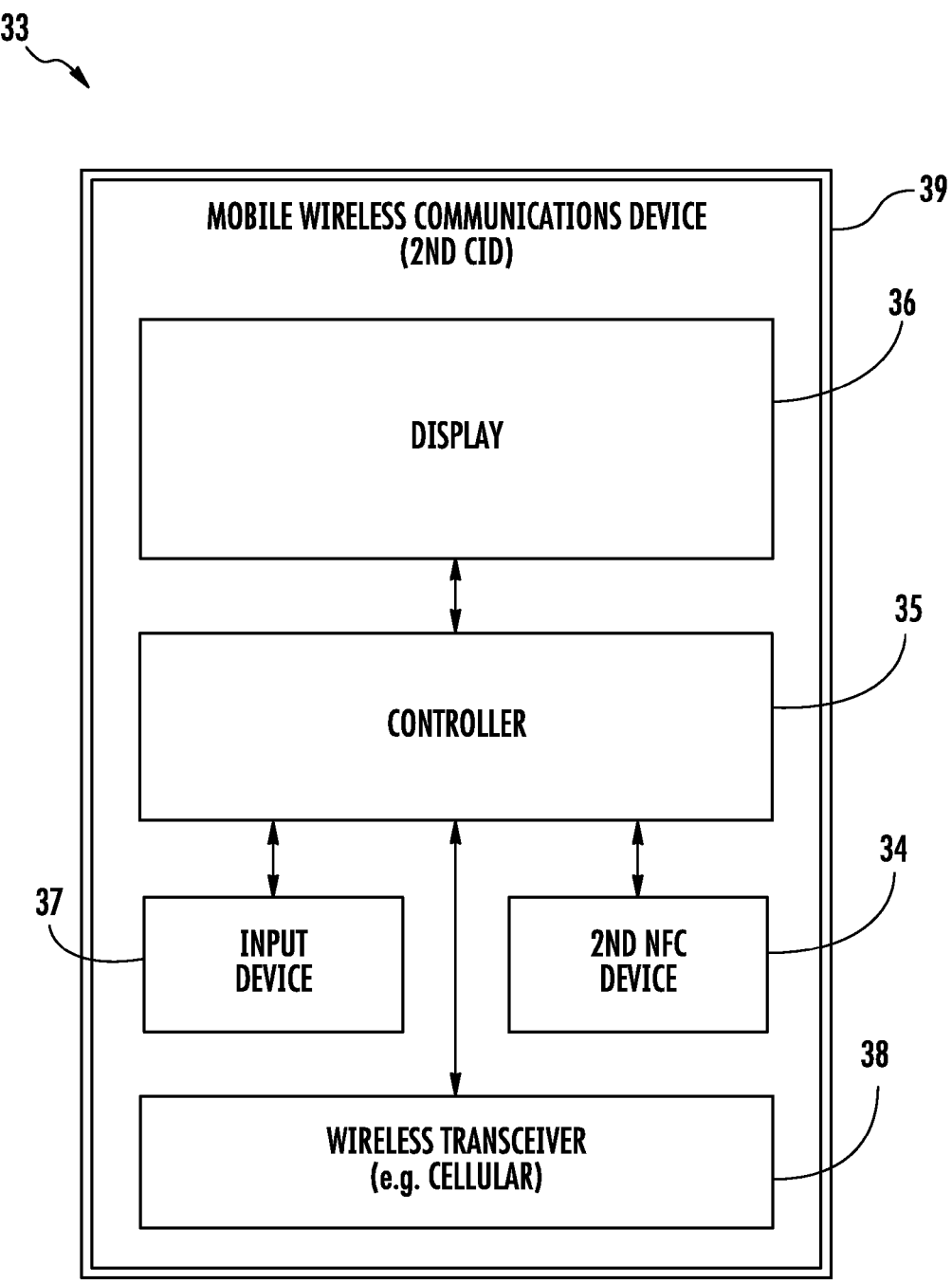
FIG. 2 is a schematic block diagram of an example embodiment of the mobile wireless communications device of the system of FIG. 1.
Figure 3:
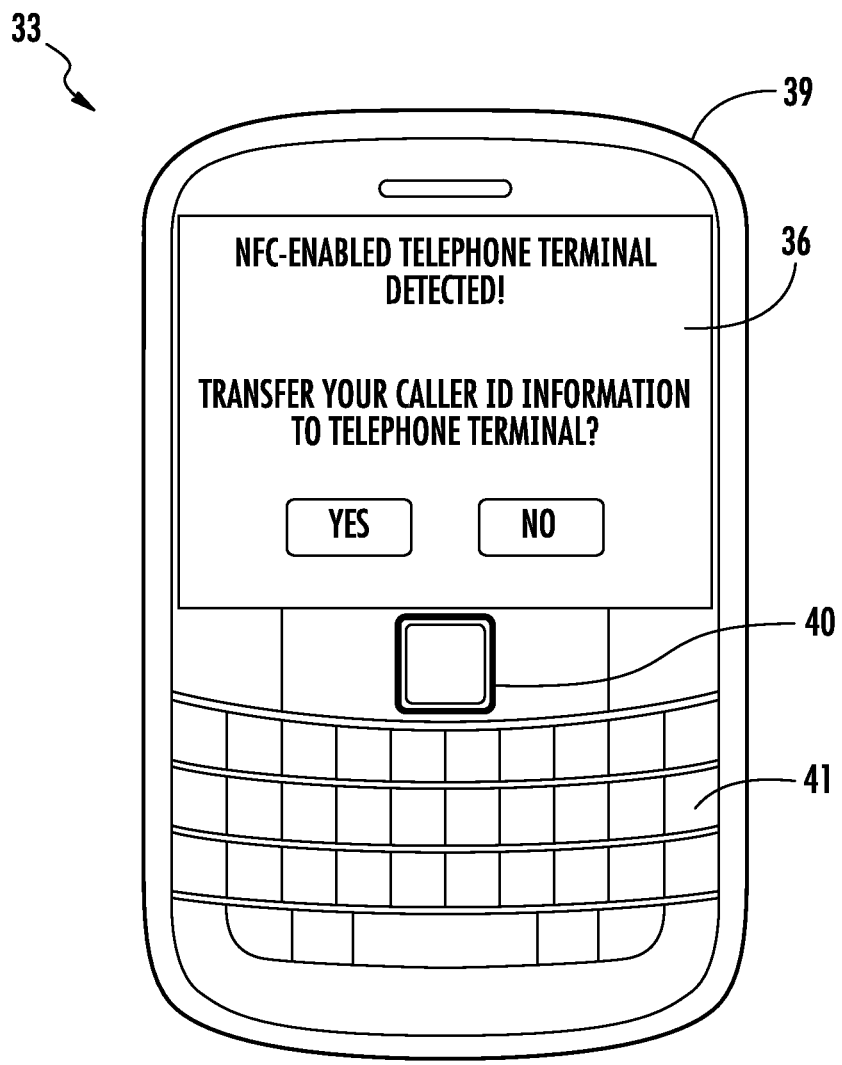
FIG. 3 is a front view of an example embodiment of the mobile wireless communications device of FIG. 2.

Referring additionally to FIGS. 2 and 3, in one example embodiment the mobile device 33 illustratively includes a controller 35 coupled with a display 36 (e.g., LED, etc.), an input device 37, a wireless transceiver 38 (e.g., cellular, WiFi, WiMAX, etc.), and the second NFC device 34. These components may be carried by a portable housing 39. In the example of FIG. 3, two input devices are included, namely a track pad 40 and a keypad (or keyboard) 41, although other suitable input devices (e.g., touch screen sensor array, scroll wheel, buttons or convenience keys, track balls, etc.) may also be used. It should be noted that the second NFC device 34 may be carried by the portable housing 39 in some embodiments, but in other embodiments it may be an external NFC device, for example. By way of example, the controller 35 may be implemented using a combination of hardware (e.g., processor, memory, etc.) and computer-executable instructions configured to perform the various operations described herein.

Figure 4:
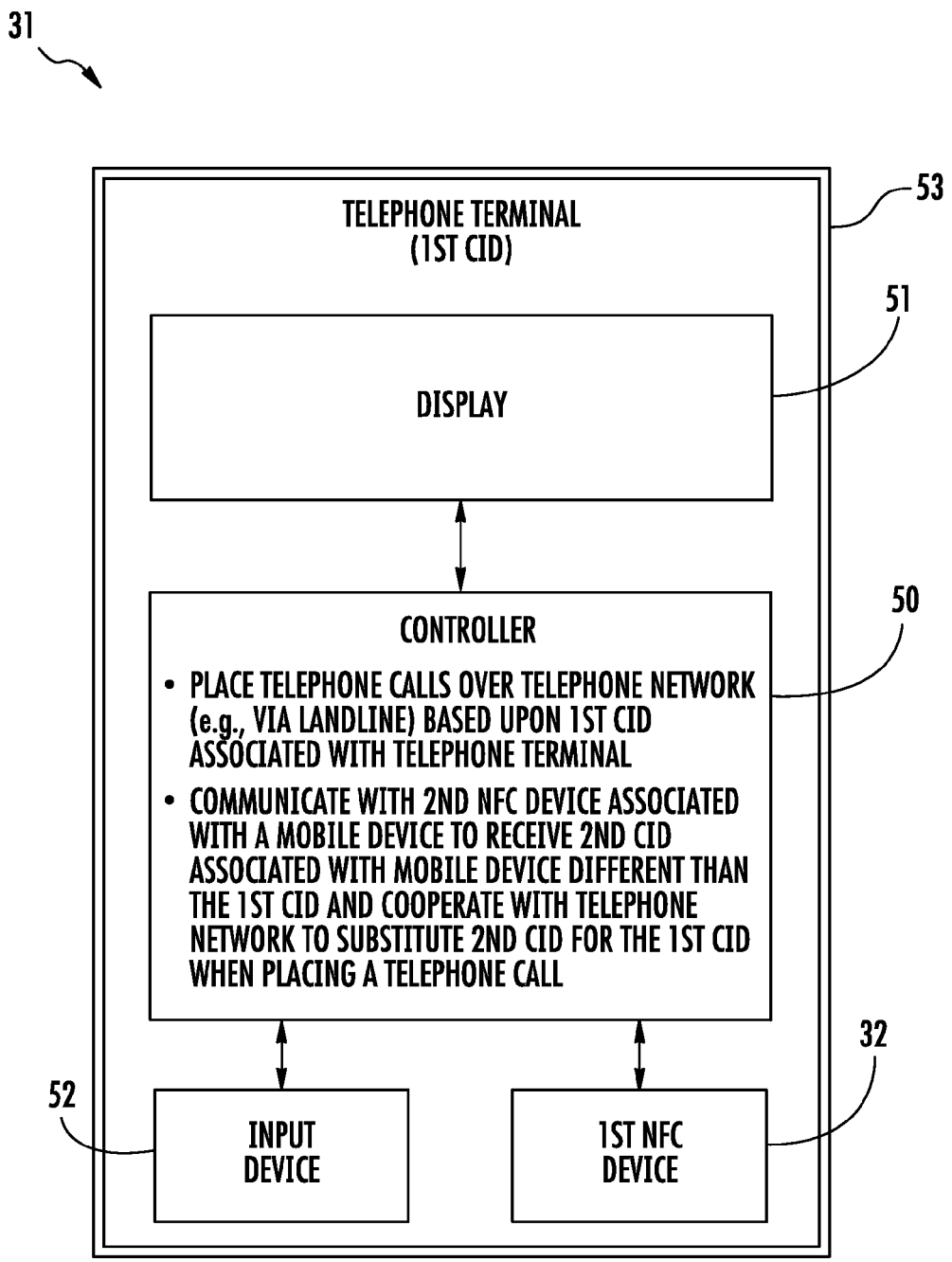
FIG. 4 is a schematic block diagram of an example embodiment of the telephone terminal of the system of FIG. 1.
Figure 5:
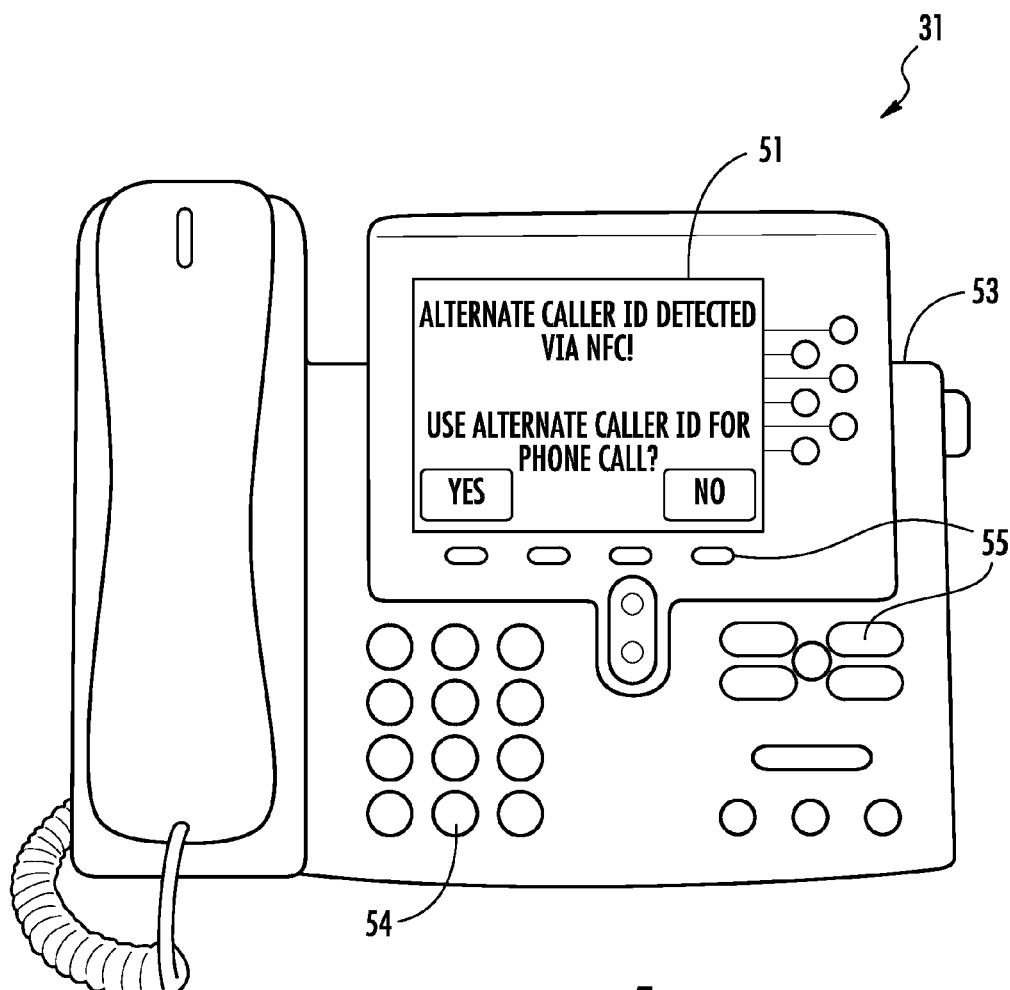
FIG. 5 is a front view of an example embodiment the telephone terminal of FIG. 4.

Referring further to FIGS. 4 and 5, the telephone terminal 31 also illustratively includes a controller 50 (which may be implemented similarly to the controller 35) coupled with a display 51, an input device 52, and the first NFC device 32. These components may also be carried by a housing 53. In the example of FIG. 5, the housing 53 takes the form of a desktop phone, such as for an office or conference room, although other telephone terminal form factors may also be used, as noted above. Also, a keypad 54 and selection buttons 55 are provided as input devices in this example, although other suitable input devices may also be used in different embodiments. It should be noted that the first NFC device 32 may be carried by the housing 53 in some embodiments, but in other embodiments it may be an external NFC device, for example.

Figure 6:
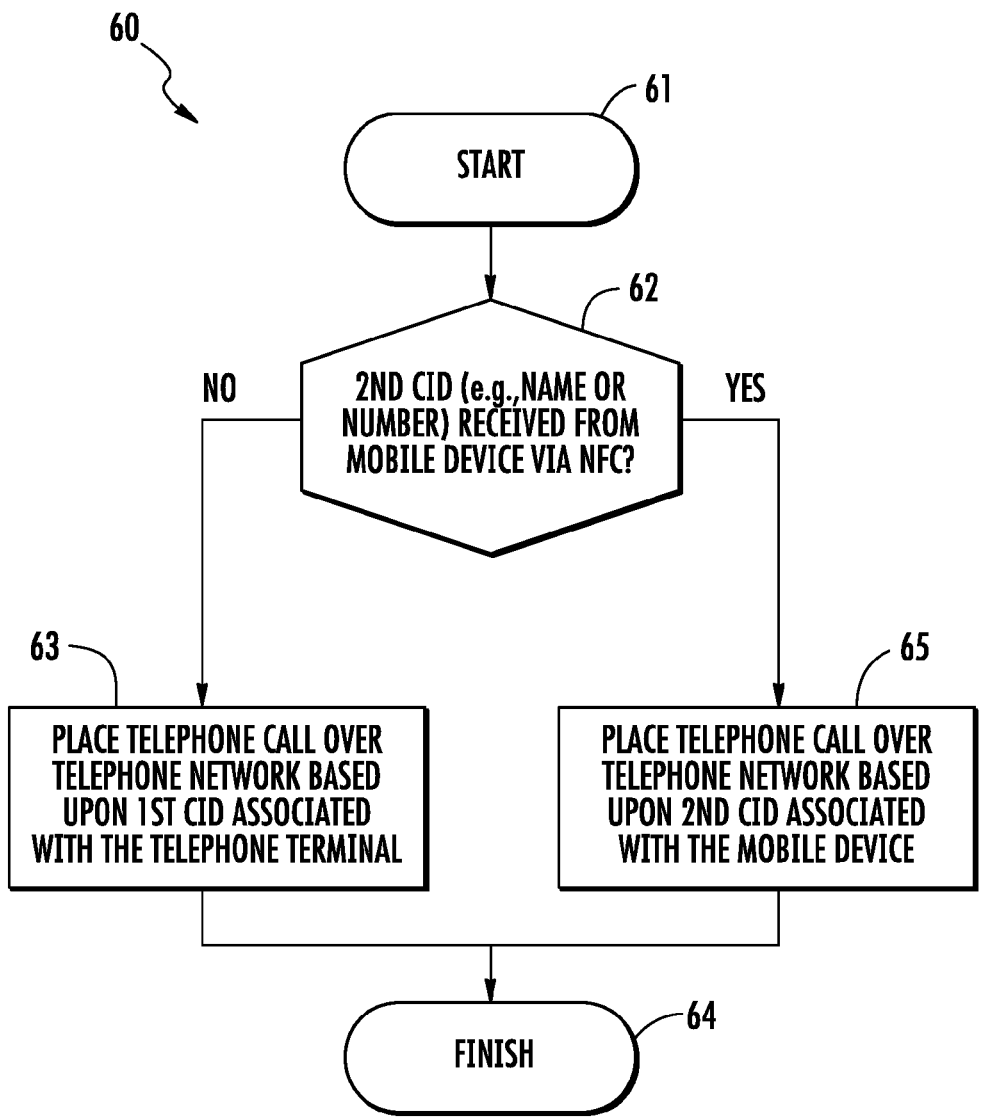
FIG. 6 is a flow diagram illustrating method aspects associated with the systems and devices of FIGS. 1-5.

The telephone terminal 31 may be configured to place a telephone call over a telephone network 56 (e.g., public switched telephone network (PSTN)) to a receiving telephone terminal 57. However, referring to the flow diagram 60 of FIG. 6, beginning at Block 61, when a call is initiated at the telephone terminal 31 (e.g., by taking the telephone line "off hook" and dialing a phone number of the receiving telephone terminal 57), the telephone terminal 31 may determine or check whether the second caller ID has been received from the mobile device 33, at Block 62. If not, the telephone terminal 31 may proceed to place the telephone call using its own caller ID information (i.e., the first caller ID associated with the telephone terminal), at Block 63, which illustratively concludes the method of FIG. 6 (Block 64).

On the other hand, if the initiator of the telephone call swipes or bumps the first NFC device 32 with the second NFC device 34 prior to or during initiation of the telephone call to the receiving telephone terminal 57, the telephone terminal 31 may advantageously cooperate with the telephone network 56 to substitute the second caller ID for the first caller ID when placing the telephone call based upon the NFC communication between the first NFC device and the second NFC device, at Block 65. That is, the NFC communication may be used to provide the second caller ID from the mobile device 33 to the telephone terminal 31 so that the telephone terminal may initiate the telephone call as if it were coming from a source associated with the second caller ID (which may be the mobile device itself or another communications device), rather than or instead of the first caller ID. As such, it will appear to the call recipient at the receiving telephone terminal 57 that the call is originating from the source associated with the second caller ID, but it is in actuality originating from the telephone terminal 31. This may advantageously allow the call originator or initiator to use the telephone terminal 31 for added convenience or to avoid undesirable wireless communications charges associated with the mobile wireless communications device (e.g., roaming charges while in a different country), yet while allowing the call recipient to know who is calling.

The exchange of the second caller ID information from the mobile device 33 to the telephone terminal 31 may occur in different ways. One approach is to use the input device 37 and display 36 to pre-select the second caller ID information (e.g., via on-screen menus, etc.) for transfer via NFC communication prior to swiping or bumping the first NFC device 32. As such, when the swipe or bump occurs, this information is automatically transferred.

Another approach is that the controller 50 may designate to the controller 35 what type of device the telephone terminal 31 is, and accordingly request that caller ID information be provided to it. In such case, the controller 35 may generate a prompt on the display 36 notifying the user of the mobile device 33 that the NFC-enabled telephone terminal 31 has been detected, and requesting permission to proceed with transferring the second caller ID information to the telephone terminal (e.g., by selecting a "yes" or "no" soft key). Either approach may advantageously help make sure that the second caller ID information is not inadvertently sent to the telephone terminal based upon an accidental bump or swipe, although in some embodiments the second caller ID information may be transferred automatically after a bump or swipe without prompting, if desired.

Similarly, the controller 50 of the telephone terminal 31 may also be configured to provide a prompt for permission to substitute the second caller ID when the second caller ID has been received via NFC. In the example of FIG. 5, the display 51 displays a prompt informing the user that alternative caller ID information (i.e., the second caller ID information) has been detected or received via NFC communication, as well as an inquiry as to whether this alternative caller ID information should be used instead of the first caller ID information, which may be responded to by pressing appropriate buttons 55 corresponding to "yes" or "no" answers on the display. Again, this may help prevent inadvertent substitution of the second caller ID for the first caller ID when this is not intended, but use of the second caller ID may be automatic upon receipt via NFC in some embodiments without prompting, if desired.

Generally speaking, in some telephone networks caller ID information transmitted from the origin of the call (i.e., the telephone terminal 31 in the present example) will include only the calling party's phone number. The calling party's name or location is added by the receiving party's terminating central office (if the receiving party has subscribed to caller ID service). This information may be obtained by the terminating central office from a look-up database, for example. However, some caller ID systems may automatically send the calling name with the call setup and routing information at the time of the call. The telephone terminal 31 may be configured to work with either setup. For example, the telephone terminal 31 may be configured to substitute or replace its own caller ID number (i.e., the first caller ID number) with the second caller ID number when initiating a call with the telephone network 56. Alternatively, the telephone terminal 31 may append the second caller ID information along with the usual caller ID, name, call setup, routing information, etc., and that telephone network 56 may use the appended second caller ID information when connecting the call receiving telephone terminal 57.

The system 30 may therefore advantageously allow the call recipient to know who is calling, despite having the call originate from an otherwise unknown telephone terminal. Moreover, using the relatively short-range NFC wireless communications technology to communicate caller ID information to the telephone terminal 31 advantageously helps avoid unintended transmission of caller ID information from nearby devices, such as may be the case with more far-ranging wireless communications technologies such as Bluetooth or WiFi.

It should be noted that, in some embodiments, a fee may be charged for substituting the second caller ID (associated with the mobile device 33) for the first caller ID (associated with the telephone terminal 31). In accordance with one example, a hotel may allow a hotel guest to substitute the guest's caller ID for the hotel caller ID when the guest is using a telephone terminal 31 in a hotel room, and charge a fee for doing so. The fee may be paid at the time of the telephone call through the mobile device 33 based upon NFC communications, payment over the air via a cellular or WiFi network, etc. Another example implementation is that the fee or charge may accrue onto a phone bill for the mobile device 33 (e.g., a monthly usage bill from a cellular carrier network, etc.). Still another example implementation is that the charge may be added to the hotel guest's bill for the hotel stay. In any event, the telephone terminal 31 may initiate or implement the fee transaction process responsive to NFC communication from the mobile device 33 or other attempt to place a telephone call using the second (i.e., alternative) caller ID. This approach may be used in other implementations or locations besides hotels as well (e.g., airports, conference centers, shopping centers, etc.).

It should also be noted that the telephone terminal 31 may also have video or other telecommunication capabilities beyond audio voice capabilities. As such, the above-described approach may be used for substituting caller ID information for video conference calls, etc., as well.

Example components of a mobile wireless communications device 1000 that may be used in accordance with the above-described embodiments are further described below with reference to FIG. 7. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 7:
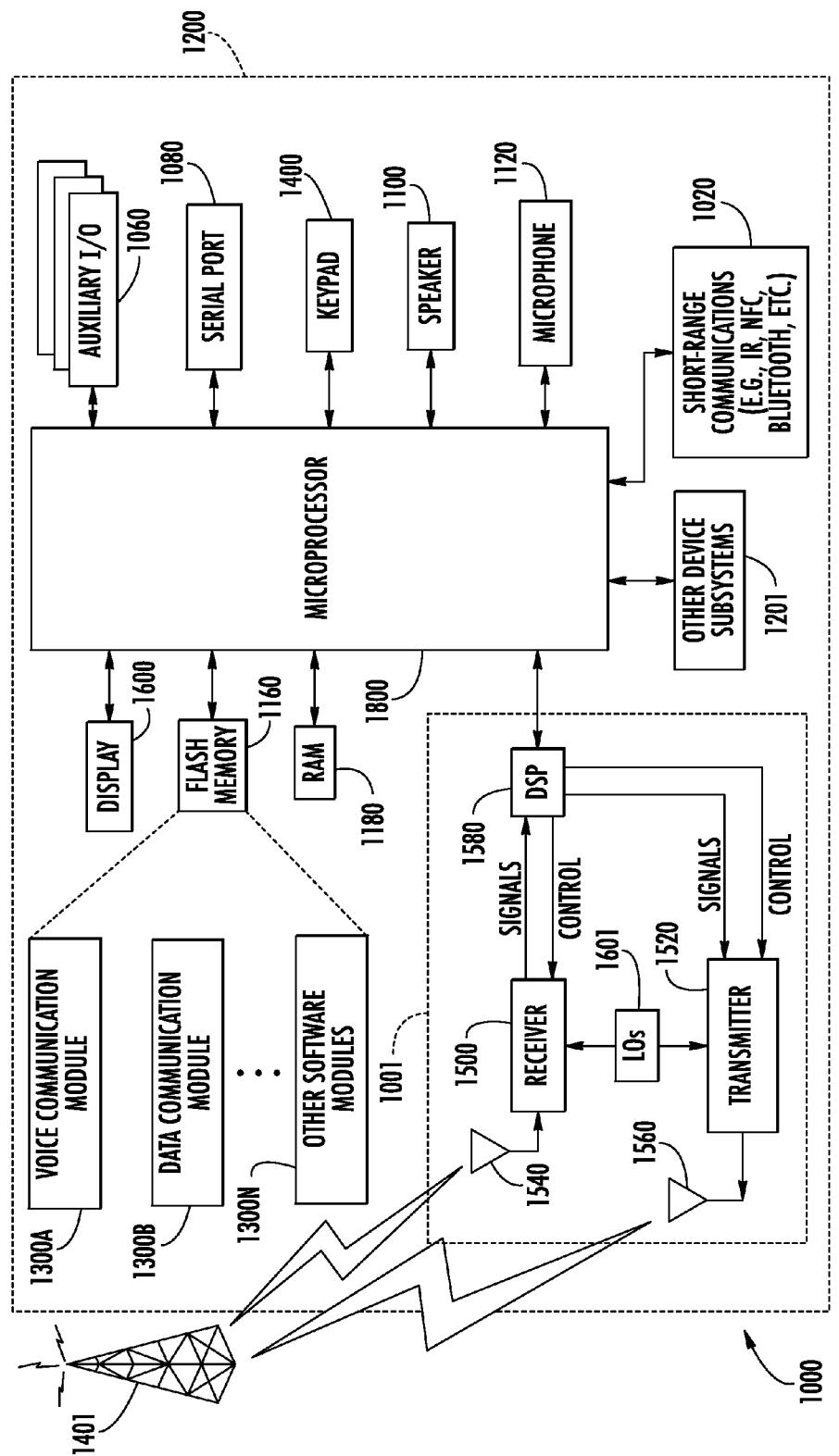
FIG. 7 is a schematic block diagram illustrating example mobile wireless communications device components that may be used with the mobile devices of FIGS. 1-3.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system comprising:
   a telephone terminal configured to connect with a public switched telephone network (PSTN) via a land line;
   a first near field communication (NFC) device associated with said telephone terminal;
   a mobile cellular communications device configured for use with a cellular communications network; and
   a second NFC device associated with said mobile cellular communications device;
   said telephone terminal having a first caller identification (ID) assigned thereto and associated with the PSTN, and said mobile cellular device having a second caller ID assigned thereto different than the first caller ID and associated with the cellular communications network;
   said telephone terminal being configured to place a telephone call over the PSTN, and cooperate with the PSTN to append the second caller ID associated with the cellular communications network to the first caller ID associated with the PSTN when placing the telephone call based upon NFC communication between said first NFC device and said second NFC device, and to initiate a fee transaction for appending the second caller ID and placing the telephone call using the second caller ID.

2. The communications system of claim 1 wherein the second caller ID comprises a telephone number associated with said mobile cellular communications device.

3. The communications system of claim 1 wherein the second caller ID comprises a name associated with said mobile cellular communications device.

4. The communications system of claim 1 wherein said mobile cellular communications device further comprises a display, a user input device, and a controller coupled with said display and said user input device; and wherein said controller is further configured to generate a prompt on said display for authorizing communication of the second caller ID to said telephone terminal.

5. The communications system of claim 1 wherein said telephone terminal comprises a public telephone terminal.

6. A mobile cellular communications device for use with a telephone terminal configured to connect with a public switched telephone network (PSTN) via a land line and having a first near field communication (NFC) device associated with the telephone terminal, the telephone terminal having a first caller identification (ID) assigned thereto and associated with the PSTN, and the mobile cellular communications device having a second caller ID assigned thereto different than the first caller ID and associated with a cellular communications network, the mobile cellular communications device comprising:
   a second NFC device; and
   a controller coupled with said second NFC device and configured to communicate the second caller ID for causing the telephone terminal to place a telephone call over the PSTN and cooperate with the telephone network to append the second caller ID associated with the cellular communications network to the first caller ID associated with the PSTN when placing the telephone call based upon the NFC communication between the first NFC device and said second NFC device, wherein a fee transaction is initiated for appending the second caller ID and placing the telephone call using the second caller ID.

7. The mobile cellular communications device of claim 6 wherein the second caller ID comprises at least one of a telephone number associated with the mobile cellular communications device or a name associated with the mobile cellular communications device.

8. The mobile cellular communications device of claim 6 further comprises a display coupled with said controller; and wherein said controller is further configured to generate a prompt on said display for authorizing communication of the second caller ID to said telephone terminal.

9. A telephone terminal comprising:
a first near field communication (NFC) device; and a controller coupled with said first NFC device and configured to place telephone calls over a public switched telephone network (PSTN) via a land line based upon a first caller identification (ID) assigned to the telephone terminal and associated with the PSTN, and
communicate with a second NFC device associated with a mobile cellular communications device to receive a second caller ID assigned to the mobile cellular communications device different than the first caller ID and associated with a cellular communications network and, based upon receipt of the second caller ID, cooperate with the PSTN to append the second caller ID associated with the cellular communications network to the first caller ID associated with the PSTN when placing a telephone call, and to initiate a fee transaction for appending the second caller ID and placing the telephone call using the second caller ID.

10. The telephone terminal of claim 9 wherein the second caller ID comprises at least one of a telephone number associated with the mobile cellular communications device and a name associated with the mobile cellular communications device.

11. A communications method for a telephone terminal configured to connect with a public switched telephone network (PSTN) via a land line and having a first near field communication (NFC) device associated with the telephone terminal and comprising:
placing telephone calls over the PSTN based upon a first caller identification (ID) assigned to the telephone terminal and associated with the PSTN; and
communicating with a second NFC device associated with a mobile cellular communications device to receive a second caller ID assigned to the mobile cellular communications device different than the first caller ID and associated with a cellular communications network and, based upon receipt of the second caller ID, cooperating with the PSTN to append the second caller ID associated with the cellular communications network to the first caller ID associated with the PSTN when placing a telephone call, and to initiate a fee transaction for appending the second caller ID and placing the telephone call using the second caller ID.

12. The method of claim 11 wherein the second caller ID comprises at least one of a telephone number associated with the mobile cellular communications device or a name associated with the mobile cellular communications device.

* * * * *